(12) United States Patent
Oh et al.

(10) Patent No.: US 12,191,540 B2
(45) Date of Patent: Jan. 7, 2025

(54) MEMBRANE HUMIDIFIER FOR FUEL CELL

(71) Applicant: KOLON INDUSTRIES, INC., Seoul (KR)

(72) Inventors: Young Seok Oh, Seoul (KR); Kyoung Ju Kim, Seoul (KR); Woong Jeon Ahn, Seoul (KR)

(73) Assignee: KOLON INDUSTRIES, INC., Seoul (KR)

(*) Notice: Subject to any disclaimer, the term of this patent is extended or adjusted under 35 U.S.C. 154(b) by 510 days.

(21) Appl. No.: 17/417,768

(22) PCT Filed: Dec. 20, 2019

(86) PCT No.: PCT/KR2019/018173
§ 371 (c)(1),
(2) Date: Jun. 24, 2021

(87) PCT Pub. No.: WO2020/138854
PCT Pub. Date: Jul. 2, 2020

(65) Prior Publication Data
US 2022/0013798 A1     Jan. 13, 2022

(30) Foreign Application Priority Data
Dec. 28, 2018    (KR) .................. 10-2018-0171473

(51) Int. Cl.
*H01M 8/04119*     (2016.01)
*B01D 63/02*     (2006.01)
*H01M 8/0662*     (2016.01)

(52) U.S. Cl.
CPC ........ *H01M 8/04149* (2013.01); *B01D 63/02* (2013.01); *H01M 8/0687* (2013.01);
(Continued)

(58) Field of Classification Search
None
See application file for complete search history.

(56) References Cited

U.S. PATENT DOCUMENTS

2004/0247985 A1   12/2004   Takebe
2005/0284116 A1   12/2005   Duffy
(Continued)

FOREIGN PATENT DOCUMENTS

CN     101258633 A     9/2008
CN     108075153 A     5/2018
(Continued)

OTHER PUBLICATIONS

JP2007285600A_ENG (Espacenet machine translation of Nagasaki) (Year: 2007).*
(Continued)

*Primary Examiner* — Gabriel E Gitman
(74) *Attorney, Agent, or Firm* — Harvest IP Law, LLP

(57) ABSTRACT

Disclosed is a membrane humidifier for a fuel cell, which can prevent, without a separate gas filtering device, performance deterioration of a fuel cell due to harmful gases during a humidifying process. The humidifier comprises: a housing unit comprising a first fluid inlet, a first fluid outlet, a second fluid inlet, and a second fluid outlet, wherein the humidity of the first fluid introduced via the first fluid inlet is different from the humidity of the second fluid introduced via the second fluid inlet; at least one first cartridge installed inside the housing unit, the first cartridge having a plurality of hollow fiber membranes therein; and a gas filter provided in the first cartridge or between the inner circumferential surface of the housing unit and the first cartridge so as to capture harmful gases contained in the first or second fluid.

9 Claims, 7 Drawing Sheets

(52) U.S. Cl.
CPC .... *B01D 2313/20* (2013.01); *B01D 2313/201* (2022.08); *B01D 2313/44* (2013.01); *B01D 2313/54* (2013.01)

(56) References Cited

U.S. PATENT DOCUMENTS

| | | | | |
|---|---|---|---|---|
| 2009/0117415 A1 * | 5/2009 | Leister | .............. | H01M 8/04141 |
| | | | | 429/414 |
| 2011/0239866 A1 | 10/2011 | Coan | | |
| 2014/0315108 A1 * | 10/2014 | Li | .................. | H01M 8/2475 |
| | | | | 429/436 |
| 2016/0079616 A1 * | 3/2016 | Lee | ................. | B01D 53/228 |
| | | | | 210/321.88 |
| 2017/0358808 A1 * | 12/2017 | Kim | ................ | H01M 8/04149 |
| 2018/0145357 A1 | 5/2018 | Coms | | |

FOREIGN PATENT DOCUMENTS

| | | | | | |
|---|---|---|---|---|---|
| CN | 108325335 A | * | 7/2018 | ......... | B01D 53/0407 |
| DE | 202006020287 U1 | | 4/2008 | | |
| DE | 102014205029 A1 | * | 9/2015 | ........ | H01M 8/04141 |
| JP | 2007285600 A | * | 11/2007 | ............. | Y02E 60/50 |
| JP | 2008-004437 A | | 1/2008 | | |
| JP | 2009507350 A | | 2/2009 | | |
| JP | 3169785 U | | 8/2011 | | |
| JP | 2013-062225 A | | 4/2013 | | |
| JP | 2018-508340 A | | 3/2018 | | |
| JP | 2018201721 A | | 12/2018 | | |
| KR | 20130029306 A | | 3/2013 | | |
| KR | 20140003182 A | * | 1/2014 | ............... | F24F 3/14 |
| KR | 20140038223 A | | 3/2014 | | |
| KR | 20150113503 A | | 10/2015 | | |
| WO | 2019240481 A1 | | 12/2019 | | |

OTHER PUBLICATIONS

CN108325335A_ENG (Espacenet machine translation of Zhu) (Year: 2018).*
KR20140003182A_ENG (Espacenet machine translation of Kim) (Year: 2014).*
DE102014205029A1_ENG (Espacenet machine translation of Grundei) (Year: 2015).*
EP Search report dated Sep. 19, 2022.
The office action dated Sep. 28, 2023 related to the corresponding Chinese Patent application.
JP office action dated Jun. 6, 2022.
European Search report dated Nov. 15, 2024, for a corresponding EP patent application.

* cited by examiner (a)

(b)

MEMBRANE HUMIDIFIER FOR FUEL CELL

CROSS REFERENCE TO RELATED APPLICATIONS

This application is a National Stage of International Application No. PCT/KR2019/018173 filed Dec. 20, 2019, claiming priority based on Korean Patent Application No. 10-2018-0171473 filed Dec. 28, 2018.

TECHNICAL FIELD

The present disclosure relates to a membrane humidifier for a fuel cell, and more particularly to a membrane humidifier for a fuel cell capable of removing gas, such as nitrogen oxide ($NO_x$), sulfur oxide ($SO_x$), and ammonia ($NH_3$), during a humidification process without a separate gas filter device, whereby it is possible to prevent deterioration in performance of the fuel cell.

BACKGROUND ART

A fuel cell is a power generation cell that combines hydrogen and oxygen to generate electricity. Such a fuel cell has advantages in that it is possible to continuously generate electricity as long as hydrogen and oxygen are supplied, unlike a general chemical cell such as a dry cell, a storage cell, and so on, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, in the case in which the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a humidification membrane method of supplying moisture to a gas fluid bed using a polymer separation membrane are used as methods of humidifying the polymer electrolyte membrane or the proton exchange membrane.

Among these methods, the humidification membrane method, which provides water vapor to a gas that is supplied to the polymer electrolyte membrane or the proton exchange membrane by means of a membrane configured to selectively transmit only water vapor included in off-gas in order to humidify the polymer electrolyte membrane or the proton exchange membrane, is advantageous in that it is possible to reduce the weight and size of a humidifier.

In the case in which a module is formed, a hollow fiber membrane having large transmission area per unit volume is suitable for the permselective membrane used in the humidification membrane method. That is, in the case in which a membrane humidifier is manufactured using a hollow fiber membrane, high integration of the hollow fiber membrane having large contact surface area is possible, whereby it is possible to sufficiently humidify a fuel cell even in the case of a small capacity, it is possible to use a low-priced material, and it is possible to collect moisture and heat included in off-gas discharged from the fuel cell at a high temperature and to reuse the collected moisture and heat through the humidifier.

In a conventional membrane humidifier for a fuel cell, a hollow fiber membrane is accommodated in a housing unit, and the hollow fiber membrane is fixed to the inner wall of the housing unit by means of a potting portion. A certain number of hollow fiber membranes are accommodated in the housing unit depending on a desired output of a stack, and are fixed to the housing unit by means of the potting portion. High-temperature air from a blower and high-temperature and high-humidity air from the stack are introduced into the membrane humidifier for a fuel cell.

In a fuel cell system, when high-temperature air generated by a compressor or a blower is introduced into a stack via a humidifier, the substances such as nitrogen oxide ($NO_x$), sulfur oxide ($SO_x$), ammonia ($NH_3$), etc. included in the air are introduced into the fuel cell stack and may deteriorate the performance of the stack. For this reason, a separate gas filter device configured to remove such substances is generally installed at the front or rear end of the air compressor.

RELATED PATENT DOCUMENTS

1. Korean Patent Application Publication No. 10-2009-0013304
2. Korean Patent Application Publication No. 10-2009-0057773
3. Korean Patent Application Publication No. 10-2009-0128005
4. Korean Patent Application Publication No. 10-2000-0108092
5. Korean Patent Application Publication No. 10-2000-0131631
6. Korean Patent Application Publication No. 10-2001-0001022
7. Korean Patent Application Publication No. 10-2001-0006122
8. Korean Patent Application Publication No. 10-2001-0006128
9. Korean Patent Application Publication No. 10-2001-0021217

10. Korean Patent Application Publication No. 10-2001-0026696
11. Korean Patent Application Publication No. 10-2001-0063366

DISCLOSURE

Technical Problem

It is an object of the present disclosure to provide a membrane humidifier for a fuel cell capable of removing gas such as nitrogen oxide ($NO_x$), sulfur oxide ($SO_x$), ammonia ($NH_3$) and so on during a humidification process without a separate gas filter device, whereby it is possible to prevent deterioration in performance of the fuel cell.

Technical Solution

A membrane humidifier for a fuel cell according to the present disclosure to accomplish the above object includes a housing unit including a first fluid inlet for introduction of a first fluid, a first fluid outlet for discharge of the first fluid, a second fluid inlet for introduction of a second fluid, and a second fluid outlet for discharge of the second fluid, humidity of the first fluid introduced through the first fluid inlet being different from humidity of the second fluid introduced through the second fluid inlet, at least one first cartridge installed in the housing unit, the first cartridge having a plurality of hollow fiber membranes therein, and a gas filter provided in the first cartridge or between the inner circumferential surface of the housing unit and the first cartridge, the gas filter being configured to capture harmful gas included in at least one of the first and second fluids, the gas filter having a different shape from the hollow fiber membranes, the harmful gas including nitrogen oxide ($NO_x$), sulfur oxide ($SO_x$), ammonia ($NH_3$), or a mixture of two or more thereof.

The membrane humidifier may further include at least one second cartridge installed in the housing unit, wherein the second cartridge may be filled only with the gas filter.

The gas filter may be arranged in the first cartridge together with the hollow fiber membranes.

The gas filter may include a non-woven fabric and a gas capture material coated on the non-woven fabric.

The gas filter may include a yarn and a gas capture material coated on the yarn.

The membrane humidifier may include a plurality of the first cartridges, and the gas filter may be mounted in the housing unit in such a way as to surround the first cartridges together.

The gas filter may be mounted over the inner circumferential surface or the outer circumferential surface of the first cartridge in such a way as to surround the plurality of hollow fiber membranes.

The gas filter may include a non-woven fabric and a gas capture material coated on the non-woven fabric.

The gas capture material may be any one selected from the group consisting of biochar, charcoal, active carbon, an acidic polymer, zeolite, platinum, a mixture of copper sulfate and titanium sulfate, niobium (Nb), sodium bicarbonate, and a mixture of two or more thereof.

The acidic polymer may be any one selected from the group consisting of poly(perfluorosulfonic acid) (PFSA), sulfonated polyethersulfone (S-PES), sulfonated polyarylethersulfone (S-PAES), sulfonated polystyrene (S-PS), sulfonated polyetherketone (S-PEK), sulfonated polyetheretherketone (S-PEEK), and a mixture of two or more thereof.

The gas filter may be mounted in the housing unit in such a way that the first fluid introduced through the first fluid inlet passes through the gas filter before being introduced into lumens of the hollow fiber membranes.

The housing unit may include a middle case having the first cartridge mounted therein and a pair of cap cases coupled to opposite sides of the middle case, the second fluid inlet and the second fluid outlet being formed in the middle case, the first fluid inlet and the second fluid outlet being formed in the cap cases, respectively, and the gas filter may be separably mounted between the cap case having the first fluid inlet and the middle case.

The gas filter may include a filter portion and a frame portion, the frame portion being coupled to the filter portion in such a way as to surround the filter portion, and the filter portion may include a non-woven fabric and a gas capture material coated on the non-woven fabric.

Advantageous Effects

The membrane humidifier for a fuel cell according to the present disclosure described above is capable of removing gas, such as nitrogen oxide ($NO_x$), sulfur oxide ($SO_x$), ammonia ($NH_3$), and so on during a humidification process without a separate gas filter device, whereby it is possible to prevent deterioration in performance of a fuel cell.

BEST MODE

Figure 1:
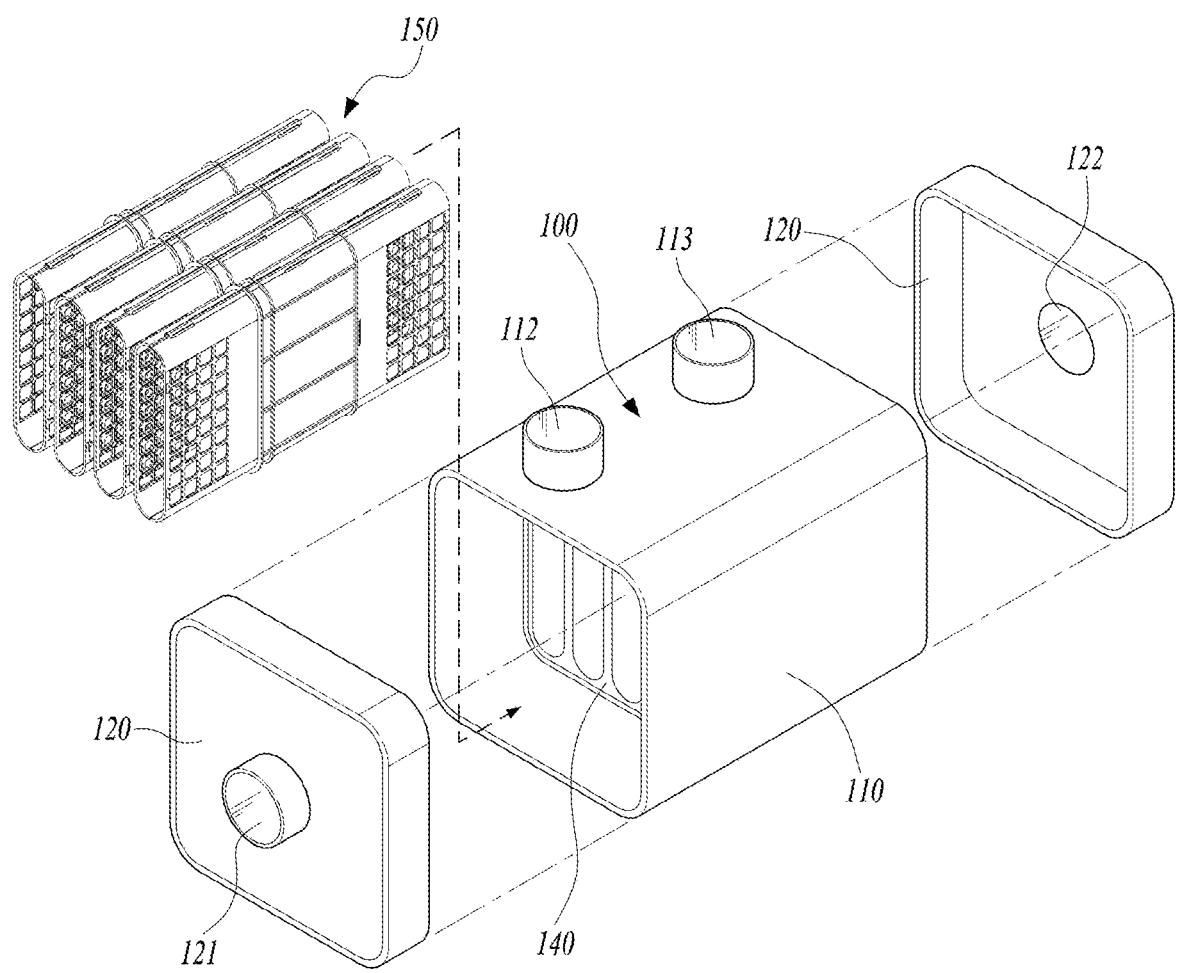
FIG. 1 is an exploded perspective view of a membrane humidifier for a fuel cell according to an embodiment of the present disclosure.
Figure 2:
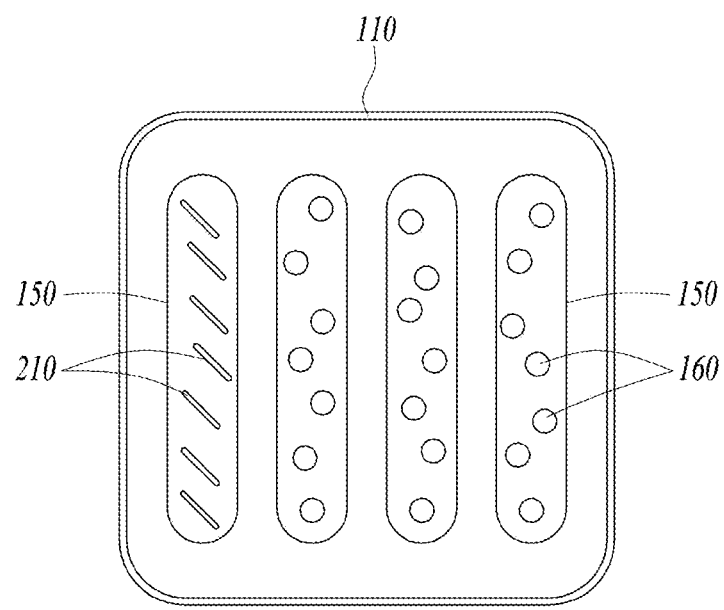
FIG. 2 is a sectional view of a membrane humidifier according to a first embodiment of the present disclosure.
Figure 3:
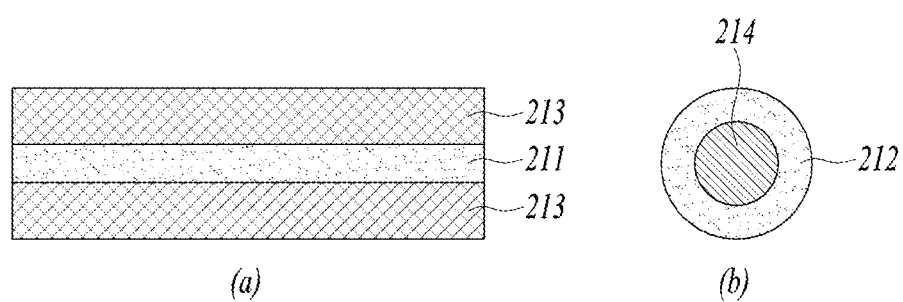
FIG. 3 is a sectional view of embodiments relating to the type of a gas filter.

FIG. 1 is an exploded perspective view of a membrane humidifier for a fuel cell according to an embodiment of the present disclosure, FIG. 2 is a sectional view showing a membrane humidifier according to a first embodiment of the present disclosure, and FIG. 3 is a sectional view showing embodiments relating to the type of a gas filter.

The membrane humidifier for a fuel cell according to the embodiment of the present disclosure includes a housing unit and a plurality of cartridges 150 installed in the housing unit. At least one of the cartridges 150 is a first cartridge having a plurality of hollow fiber membranes 160 therein. A middle case 110 and a cap case 120 may be coupled to each other in order to form the housing unit, or the housing unit may be formed as one body.

The middle case 110 is coupled to a pair of cap cases 120 at opposite sides thereof to define the external appearance of the membrane humidifier. Each of the middle case 110 and the cap cases 120 may be made of hard plastic, such as polycarbonate, or metal. The lateral sectional shape of each of the middle case 110 and the cap cases 120 may be a polygon as shown in FIG. 1, or the lateral sectional shape thereof may be a circle. The polygon may be a rectangle, a square, a trapezoid, a parallelogram, a pentagon, a hexagon, and so on, and the corners of the polygon may be rounded. In addition, the circle may be an oval.

The middle case 110 is provided with a second fluid inlet 112 through which a second fluid is introduced and a second fluid outlet 113 through which the second fluid is discharged.

One of the cap cases 120 coupled to opposite ends of the middle case 110 has a first fluid inlet 121, and the other cap case 120 has a first fluid outlet 122. A first fluid introduced into the housing unit through the first fluid inlet 121 passes through an inner pipeline of each of the hollow fiber membranes 160 accommodated in the first cartridge 150 and is then discharged through the first fluid outlet 122. The first fluid inlet 121 and the first fluid outlet 122 may switch with each other so that the first fluid flows in the reverse direction.

Each of the hollow fiber membranes 160 may be a hollow fiber membrane made of, for example, Nafion, polyetherimide, polyimide (PI), polyphenylsulfone, polysulfone (PS), or polyethersulfone (PES).

A mesh portion 152 configured to allow the second fluid introduced into the membrane humidifier through the second fluid inlet 112 to be introduced into the first cartridge 150 may be formed at one side of the first cartridge 150, and a mesh portion 152 configured to allow the second fluid that has performed moisture exchange in the hollow fiber membrane cartridge 150 to be discharged out of the first cartridge 150 may be formed at the other side of the first cartridge 150.

The first cartridge 150 is provided at opposite ends thereof with potting portions configured to bind the hollow fiber membranes 160 and to fill the gaps between the hollow fiber membranes 160. In this way, the opposite ends of the first cartridge 150 are blocked by the potting portions, respectively, whereby a flow passage configured to allow the second fluid to pass therethrough is defined therein. Each of the potting portions is made of a known material, and a detailed description thereof will be omitted here.

The middle case 110 has the second fluid inlet 112 and the second fluid outlet 113.

The first fluid may be a low-humidity fluid (e.g. external air supplied by a blower), and the second fluid may be a high-humidity fluid (e.g. high-humidity off-gas discharged from a fuel cell stack). Alternatively, the second fluid may be low-humidity external air, and the first fluid may be high-humidity off-gas.

A plurality of insertion ports 140 configured to allow the plurality of cartridges 150 to be mounted therein may be formed in the middle case 110, and each of the cartridges 150 may be inserted into a corresponding one of the insertion ports 140.

In the present disclosure, a gas filter that is configured to capture harmful gas included in at least one of the first and second fluids and that has a different shape from the hollow fiber membranes 160 is provided in the first cartridge 150 or between the inner circumferential surface of the housing unit and the first cartridge 150. The harmful gas includes nitrogen oxide ($NO_x$), sulfur oxide ($SO_x$), ammonia ($NH_3$), or a mixture of two or more thereof. Since the gas filter is provided in the housing unit, the membrane humidifier 100 for a fuel cell according to the embodiment of the present disclosure can capture the harmful gas during a humidification process without a separate gas filter device, whereby it is possible to prevent deterioration in performance of a fuel cell.

In a fuel cell system, high-temperature air supplied from a compressor or a blower is introduced into a stack via a humidifier. If harmful substance included in the air, such as (i) nitrogen oxide ($NO_x$) such as nitric oxide (NO), nitrogen dioxide ($NO_2$), dinitrogen monoxide ($N_2O$), dinitrogen trioxide ($N_2O_3$), dinitrogen tetroxide ($N_2O_4$), dinitrogen pentoxide ($N_2O_5$), etc., (ii) sulfur oxide ($SO_x$) such as sulfur dioxide ($SO_2$), sulfur trioxide ($SO_3$), sulfurous acid ($H_2SO_3$), sulfuric acid ($H_2SO_4$), etc., (iii) ammonia ($NH_3$), and so on is introduced into the stack of the fuel cell, performance of the stack may be deteriorated. In the present disclosure, the gas filter provided in the membrane humidifier 100 captures the harmful substances when the air is humidified, whereby it is possible to prevent deterioration in performance of the fuel cell.

In the first embodiment of the present disclosure, as shown in FIG. 2, the plurality of cartridges 150 may include at least one first cartridge having a plurality of hollow fiber membranes 160 therein and at least one second cartridge filled only with the gas filter.

In FIG. 2, there is shown an embodiment in which hollow fiber membranes 160 are disposed in three first cartridges among the four cartridges 150 mounted in the middle case 110, and a plurality of filter members 210 are disposed in one second cartridge among the cartridges 150. If five or more cartridges 150 are mounted in the middle case 110, however, the filter members 210 may be accommodated in two or more second cartridges among the cartridges 150.

In the membrane humidifier 100 according to the first embodiment, low-humidity air is introduced into the housing unit through the second fluid inlet 112. A portion of the low-humidity air passes through the second cartridge having the filter members 210 therein so that harmful gas is captured and thus filtered. When passing through the first cartridge having the hollow fiber membranes 160 therein, the other portion of the air exchanges moisture with the first fluid, i.e., high-humidity off-gas, and becomes humidified. The filtered air and humidified air produced as the result of passing through the respective cartridges 150 are brought together and discharged through the second fluid outlet 113 so as to be supplied to the fuel cell stack.

FIG. 3 shows two types of gas filters. The gas filter shown in FIG. 3(*a*) includes a non-woven fabric 213 and a gas capture material 211 coated on the non-woven fabric 213. The non-woven fabric 213 is formed not by weaving fibers but by binding them into a form of cloth via a mechanical, chemical, or thermal process. The non-woven fabric is also referred to as an adhesive cloth. The non-woven fabric 213 has a form of a sheet or a film and serves as a substrate for fixing the gas capture material 211.

The gas filter may be produced by dissolving or dispersing the gas capture material 211 in a liquid phase, applying the same to the non-woven fabric 213, and drying the same, or may be manufactured by spraying a gas capture material 211 of powder type on the non-woven fabric 213. In particular, it is more preferable that the gas capture material 211 is coated on the non-woven fabric 213 and then the gas capture material 211 is covered with the other non-woven fabric 213. The reason for this is that such structure can prevent loss of the gas capture material 211.

A filter member 210 formed by coating the gas capture material 211 on a non-woven fabric 213 may be cut into a length equal to or less than that of the hollow fiber membrane 160 and a predetermined width, and may be disposed and potted so as to be fixed in the first and/or second cartridge 150.

The gas filter shown in FIG. 3(b) includes a yarn 214 and a gas capture material 212 coated on the yarn 214. The yarn 214 may be a monofilament or a multifilament formed of at least one selected from the group consisting of polyvinylidene fluoride, polycarbonate, polystyrene, polyester, polyolefin, polyamide, polymethylmethacrylate, polyvinyl chloride, and glass fiber, or a thread including both the monofilament and the multifilament.

The gas capture material 212 may be of the same kind as the gas capture material 211 of FIG. 3(a). The gas filter of FIG. 3(b) may be produced by applying a gas capture material 212 of liquid type to the outer circumferential surface of the yarn 214 having a circular section and then drying the same.

The gas capture materials 211 and 212 may be any one selected from the group consisting of biochar, charcoal, active carbon, an acidic polymer, zeolite, platinum, a mixture of copper sulfate and titanium sulfate, niobium (Nb), sodium bicarbonate, and a mixture of two or more thereof.

The acidic polymer may be any one selected from the group consisting of poly(perfluorosulfonic acid) (PFSA), sulfonated polyethersulfone (S-PES), sulfonated polyarylethersulfone (S-PAES), sulfonated polystyrene (S-PS), sulfonated polyetherketone (S-PEK), sulfonated polyetheretherketone (S-PEEK), and a mixture of two or more thereof.

Figure 4:
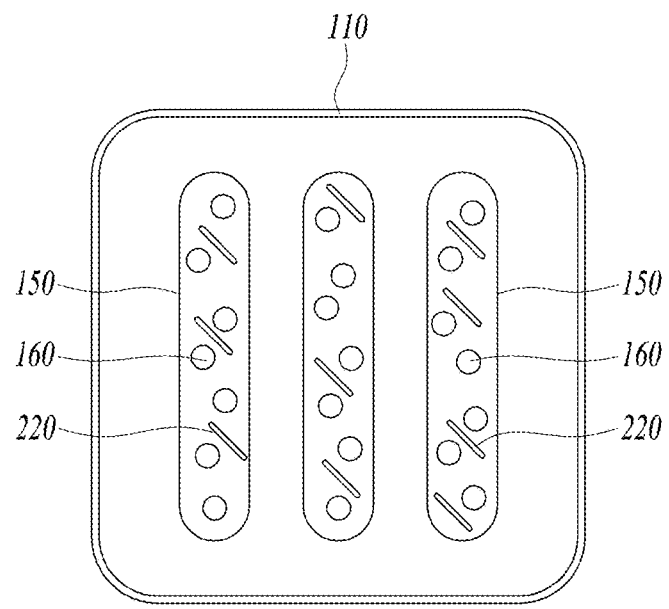
FIG. 4 is a sectional view of a membrane humidifier according to a second embodiment of the present disclosure.

FIG. 4 is a sectional view of a membrane humidifier according to a second embodiment of the present disclosure.

In the membrane humidifier according to the second embodiment, a filter member 220 of a gas filter may be arranged in a first cartridge 150 together with a plurality of hollow fiber membranes 160.

The filter member 220 may be a type formed by coating the gas capture material 211 on a non-woven fabric 213 or a type formed by coating the gas capture material 212 on an outer circumferential surface of a yarn 214, as shown in FIG. 3.

In the embodiment of FIG. 4, a plurality of hollow fiber membranes 160 and a plurality of filter members 220 are arranged together in each of three first cartridges 150 such that the filter members are interposed respectively between the hollow fiber membranes, and then potted together.

Low-humidity air is introduced into the housing unit through the second fluid inlet 112, and then (i) is humidified while flowing along the lumens of the hollow fiber membranes 160 or (ii) is filtered while passing through the filter members 220. The humidified or filtered air comes out of the respective cartridges 150, and then is discharged through the second fluid outlet 113 so as to be supplied to a fuel cell stack.

Figure 5:
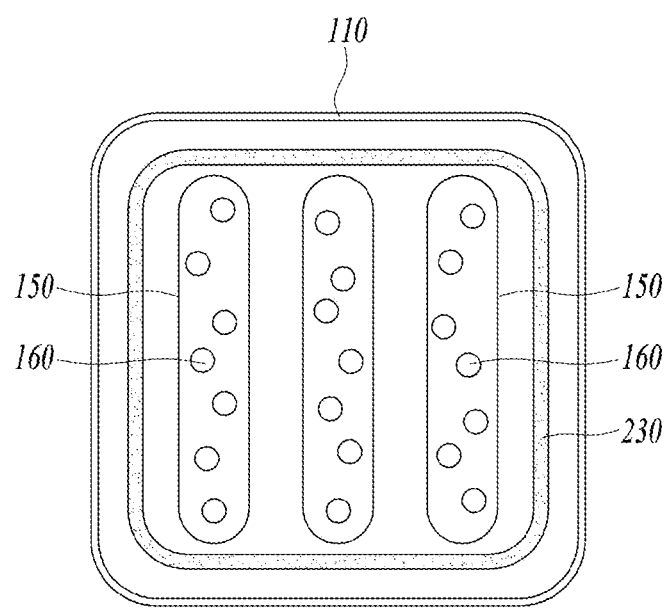
FIG. 5 is a sectional view of a membrane humidifier according to a third embodiment of the present disclosure.
Figure 6:
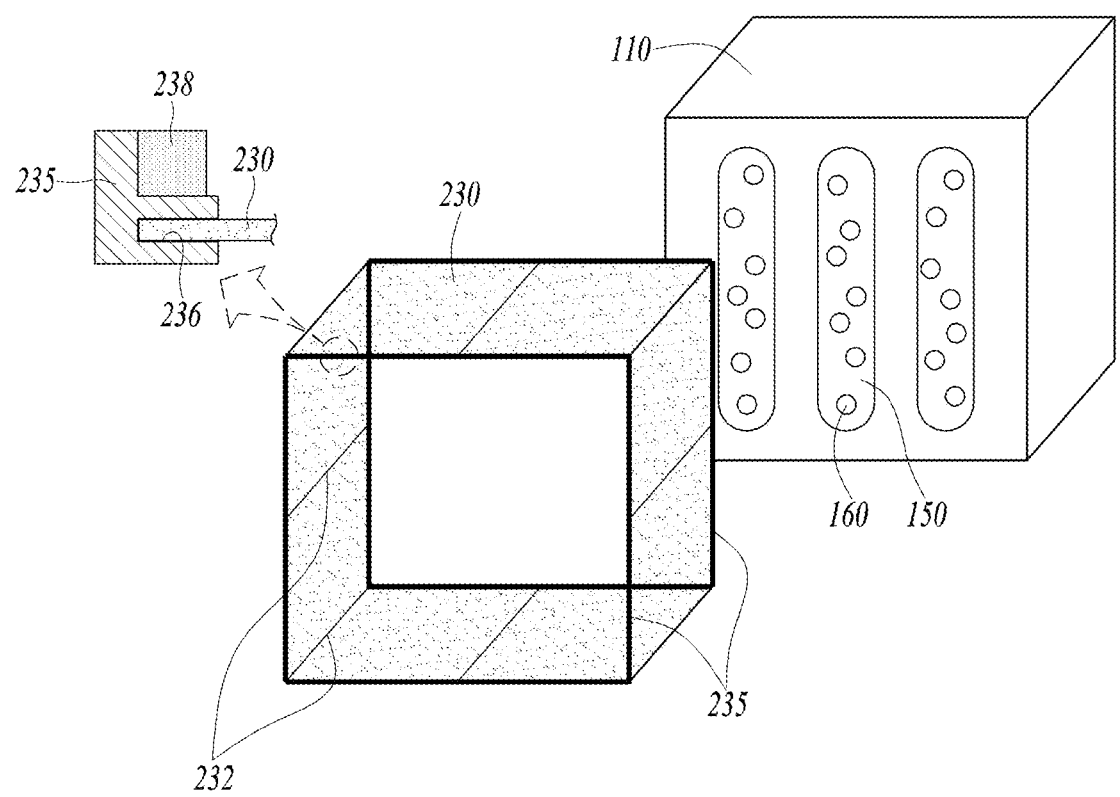
FIG. 6 is a schematic view showing the structure of a gas filter mounted in a middle case of the membrane humidifier.

FIG. 5 is a sectional view of a membrane humidifier according to a third embodiment of the present disclosure, and FIG. 6 is a schematic view showing the structure of a gas filter mounted in a middle case of the membrane humidifier.

The membrane humidifier 100 according to the third embodiment includes a plurality of first cartridges 150 each having a plurality of hollow fiber membranes 160 therein, and a filter member 230 of the gas filter is mounted in a housing unit in such a way as to surround the first cartridges 150 together.

In the third embodiment, since the filter member 230 must have a shape capable of simultaneously surrounding the plurality of first cartridges 150, it may be formed by coating a gas capture material on a non-woven fabric.

The gas capture material may be the same material as described above, and it is preferable for the gas filter 230 to have a sandwich structure in which the gas capture material is interposed between non-woven fabrics.

It is preferable for the filter member 230 to be mounted on the outer circumferential surface of a filter frame having a shape of polygonal or circular pipe. In the embodiment of FIG. 6, the filter frame may include a pair of main frame portions 235 defining the outer circumferential surface of a quadrangular pipe, the main frame portions being disposed at opposite ends of the hollow fiber membrane, and a plurality of connection frame portions 232 configured to connect the pair of main frame portions 235 to each other.

A filter fixing recess 236 may be formed in each of the inner sides of the pair of main frame portions 235 that face each other, whereby an edge of the filter member 230 may be inserted into and fixed to the filter fixing recess 236.

In addition, a sealing member 238 is preferably disposed on the outer circumferential portion of the main frame portion 235. The sealing member 238 may be made of an elastic material such as rubber and may be compressed between the main frame portion 235 and the inner surface of the middle case 110 such that a tight seal without any gap can be provided therebetween.

Since the filter member 230 formed by coating the gas capture material on the non-woven fabric is mounted in such a way as to wrap the frame, as described above, it is possible to maintain the shape of the filter member 230 constantly and to easily mount or separate the gas filter 230 to or from the inner circumferential surface of the middle case 110.

Figure 7:
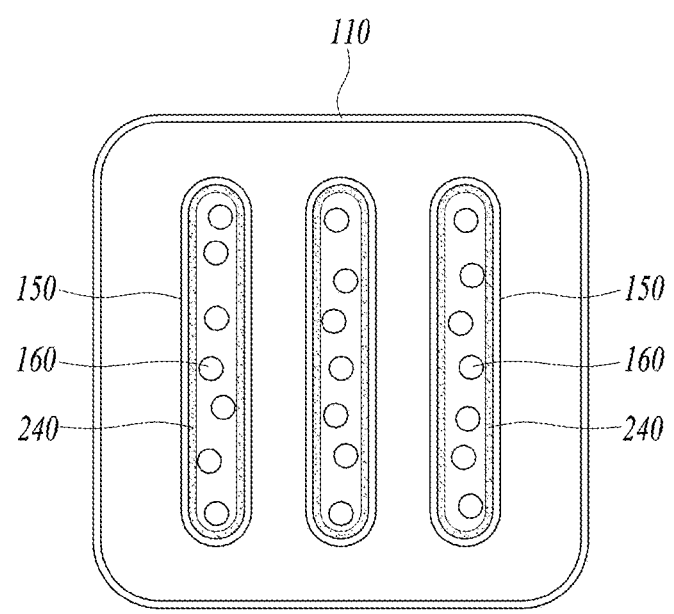
FIG. 7 is a sectional view of a membrane humidifier according to a fourth embodiment of the present disclosure.
Figure 8:
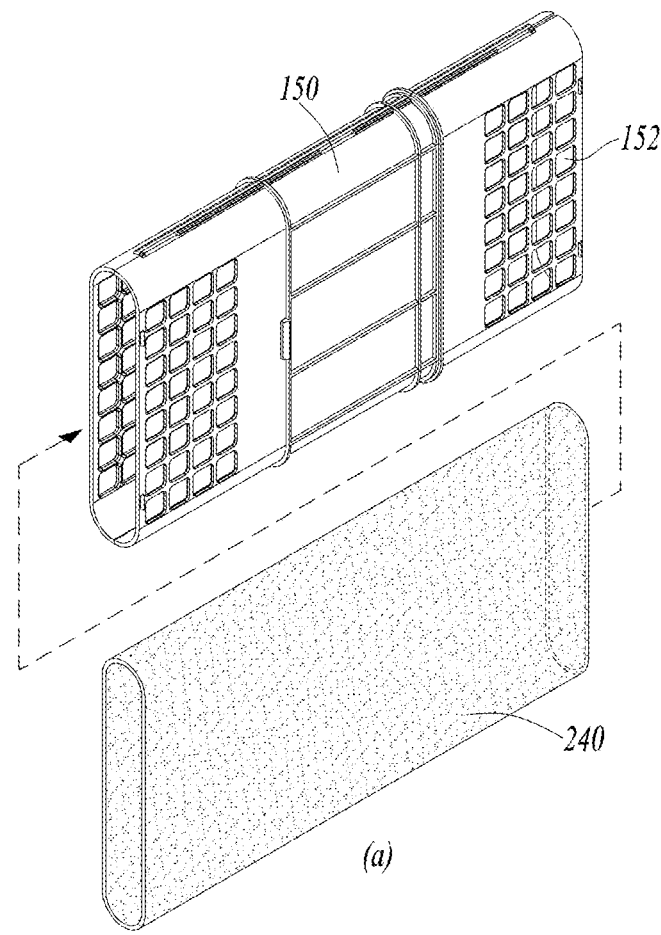
FIG. 8 is a schematic view showing a structure in which the gas filter is mounted inside or outside a cartridge of the membrane humidifier.
Figure 8:
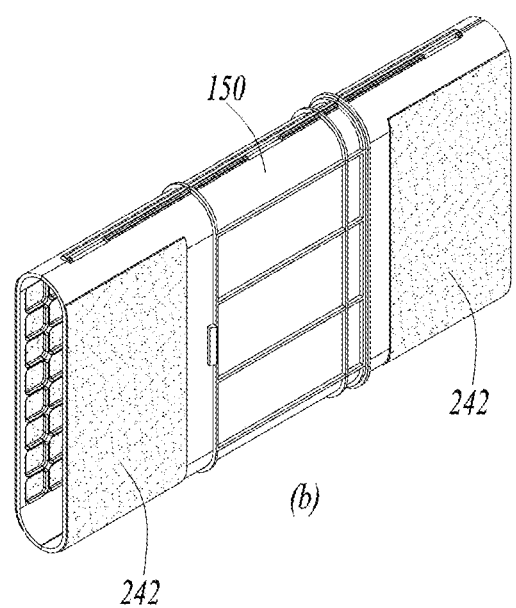

FIG. 7 is a sectional view of a membrane humidifier according to a fourth embodiment of the present disclosure, and FIG. 8 is a schematic view showing a structure in which the gas filter is mounted inside or outside a cartridge of the membrane humidifier.

In the membrane humidifier according to the fourth embodiment, a filter member 240 of the gas filter may be mounted over the inner circumferential surface or the outer circumferential surface of each of a plurality of first cartridges 150 in such a way as to surround a plurality of hollow fiber membranes 160.

FIGS. 7 and 8(a) show a filter member 240 mounted over the inner circumferential surface of the first cartridge 150. Since the filter member 240 must have a shape corresponding to that of the inner circumferential surface of the first cartridge 150, it may be formed by coating a gas capture material on a non-woven fabric.

The first cartridge 150 has a shape of a pipe that is open at opposite ends thereof. Mesh portions 152 are formed in at least two side surfaces of the first cartridge such that a second fluid is introduced through one of the mesh portions 152 and discharged through the other mesh portion 152.

A module may be manufactured by inserting a filter member 240 into the first cartridge 150 so as mount it over the inner circumferential surface thereof, arranging a plurality of hollow fiber membranes 160 therein, and then potting the hollow fiber membranes 160, the filter member 240, and the first cartridge 150 together. At this time, the filter member 240 may be mounted in such a way as to entirely block the mesh portions 152 in order to make sure that the second fluid passes through the filter member 240 when introduced into or discharged from the first cartridge 150.

According to the fourth embodiment of the present disclosure illustrated in FIG. 8(b), a filter member 242 is mounted over the outer circumferential surface of the first cartridge 150. In this case, a plurality of filter members 242 may be mounted in such a way as to block the mesh portions 152 of the first cartridge 150 at the outside thereof.

Since the filter member 242 must have a shape corresponding to that of at least a portion of the outer circumferential surface of the first cartridge 150, it may be formed by coating a gas capture material on a non-woven fabric.

Although not shown, the first cartridge 150 may be provided with a plurality of projecting ribs around the mesh portions 152 in order to allow the filter member 242 to be mounted thereon.

A module may be manufactured by mounting the filter member(s) 242 over the outer circumferential surface of the first cartridge 150, arranging a plurality of hollow fiber membranes 160 therein, and potting the hollow fiber membranes 160, the first cartridge 150, and the filter member(s) 242 together.

In the third and fourth embodiments, the gas capture material may be the same material as described in the previous embodiments.

Figure 9:
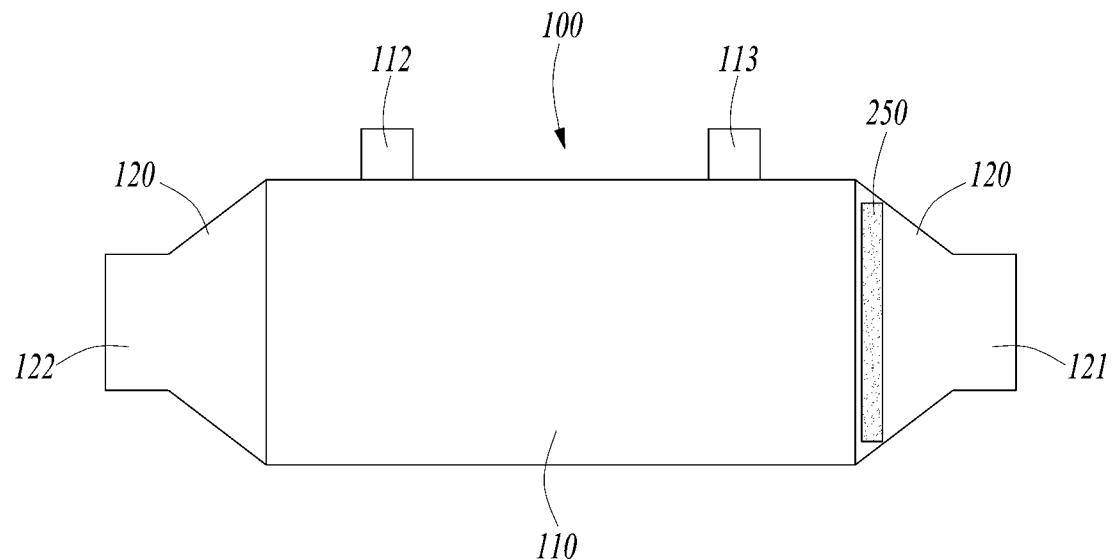
FIG. 9 is a sectional view of a membrane humidifier according to a fifth embodiment of the present disclosure.
Figure 10:
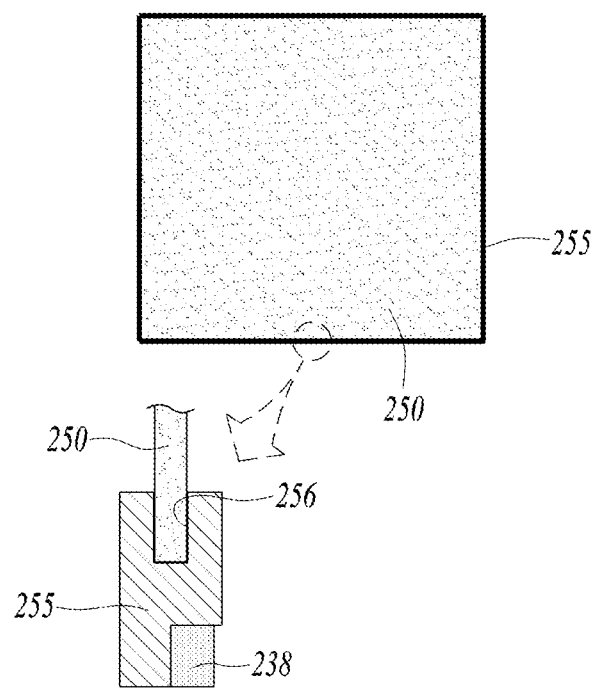
FIG. 10 is a schematic view showing the structure of a gas filter mounted between the middle case and a cap case of the membrane humidifier.

FIG. 9 is a sectional view of a membrane humidifier according to a fifth embodiment of the present disclosure, and FIG. 10 is a schematic view showing the structure of a gas filter mounted between a middle case and a cap case of the membrane humidifier.

In the membrane humidifier according to the fifth embodiment, a filter member 250 of the gas filter is mounted in a housing unit in such a way that a first fluid introduced through a first fluid inlet 121 passes through the filter member 250 of the gas filter before being introduced into the lumens of the hollow fiber membranes 160 of the first cartridge 150.

As described above, the housing unit may be configured to have a structure in which the middle case 110 is coupled to a pair of cap cases 120. The filter member 250 of the gas filter may be separably mounted in a cap case 120 having the first fluid inlet 121 or between the middle case 110 and the cap case 120 having the first fluid inlet 121.

For example, the filter member 250 may be mounted in the cap case 120 having the first fluid inlet 121, and then the middle case 110 having the first cartridges 150 mounted therein may be coupled to the cap case 120.

Although FIG. 9 shows that only the cap case 120 having the first fluid inlet 121 is provided with a filter member 250 therein, a cap case 120 having the first fluid outlet 122 may also be provided with a filter member 250 therein. If so, the filter member 250 may capture harmful gas from the first fluid introduced into the membrane humidifier 100 and may also capture harmful gas from the first fluid discharged from the membrane humidifier 100.

As shown in FIG. 10, the filter member 250 may include a filter portion formed by coating a gas capture material on a non-woven fabric and a frame portion 255 which is coupled to the filter portion in such a way as to surround the filter portion.

The frame portion 255 may have an overall shape of polygon or circle which corresponds to the sectional shape of the housing unit.

As shown in the partially enlarged section view of FIG. 10, the frame portion 255 may be provided in the inner circumferential surface thereof with a filter fixing recess 256 into which the edge of the filter member 250 is supposed to be inserted.

In addition, it is preferable for the filter member 250 to further include a sealing member 258 provided at an end of the frame portion 255, particularly at the end of the frame portion to be coupled to the cap case 120 having the first fluid inlet 121. The sealing member 258 may be made of an elastic material such as rubber and may be compressed when the filter member 250 is mounted inside the cap case 120 such that any leakage of gas through a gap between the filter member 250 and the cap case 120 can be prevented.

Hereinafter, the results of performance tests of the gas filters of the membrane humidifiers according to the above embodiments will be described.

First, in each embodiment, a film type filter member was manufactured as a gas filter by coating a polyethylene terephthalate (PET) non-woven fabric having a thickness of 100 μm with PFSA, applying zeolite and niobium particles thereto, and then attaching a PET non-woven fabric having a thickness of 100 μm thereto by melting it.

The filter member manufactured as described above was cut according to the shape of each embodiment.

First Embodiment

A membrane humidifier including four cartridges was manufactured by potting 250 filter members each cut to a size of 10 mm×300 mm in one cartridge and placing and potting hollow fiber membranes for humidification in the other three cartridges. Subsequently, three kinds of dry air including 10 ppm of $NH_3$, 10 ppm of $NO_3$, and 10 ppm of $SO_2$, respectively, were introduced into the membrane humidifier through a second fluid inlet 112, the gas discharged through a second fluid outlet 113 was captured, and the concentrations of the harmful gases therein were measured in order to determine the effect of the gas filter.

TABLE 1

|  | Concentration in Inflow gas (ppm) | Concentration in Outflow gas (ppm) |
|---|---|---|
| $NH_3$ | 10 | 3.6 |
| $NO_3$ | 10 | 6.2 |
| $SO_2$ | 10 | 5.8 |

As shown in Table 1, the gas capture performance of the gas filter according to the first embodiment was 64%, 38%, and 42% for the harmful gases. It can be seen that gas capture performance was best for $NH_3$.

Also, in order to evaluate humidification performance, humidification was performed by supplying dry air (Flow: 3500 sLPM, Temperature: 80° C., Relative humidity: 5 to 10% RH, and Absolute pressure: 1.8 bar) and wet air (Flow: 3500 sLPM, Temperature: 80° C., Relative humidity: 80% RH, and Absolute pressure: 1.6 bar) into the membrane humidifier. The dew point of the humidified air discharged from the membrane humidifier was 54° C.

Second Embodiment

A membrane humidifier including three cartridges was manufactured by placing and potting 80 filter members each cut to a size of 10 mm×300 mm in each cartridge together with a plurality of hollow fiber membranes. Subsequently, the effect of the gas filter was determined using the same method as in the first embodiment described above.

TABLE 2

|  | Concentration in Outflow gas (ppm) | Concentration in Outflow gas (ppm) |
|---|---|---|
| $NH_3$ | 10 | 2.8 |
| $NO_3$ | 10 | 4.1 |
| $SO_2$ | 10 | 3.7 |

As shown in Table 2, the gas capture performance of the gas filter according to the second embodiment was 72%, 59%, and 63% for the harmful gases. It can be seen that gas capture performance was best for $NH_3$.

In addition, the evaluation of the humidification performance using the same method as in the first embodiment described above showed that the dew point of the humidified air discharged from the membrane humidifier was 56° C.

Third Embodiment

A membrane humidifier including three cartridges was manufactured by mounting a filter member cut to a size of 120 mm×460 mm between a housing unit and the three cartridges. Subsequently, the effect of the gas filter was determined using the same method as in the first embodiment described above.

TABLE 3

|  | Concentration in Inflow gas (ppm) | Concentration in Outflow gas (ppm) |
|---|---|---|
| $NH_3$ | 10 | 0.9 |
| $NO_3$ | 10 | 1.1 |
| $SO_2$ | 10 | 1.3 |

As shown in Table 3, the gas capture performance of the gas filter according to the third embodiment was 91%, 89%, and 87% for the harmful gases. It can be seen that gas capture performance was best for $NH_3$. The gas capture performance of the third embodiment was better than those of the first and second embodiments. The reason for this is that, while only a portion of the introduced dry air passed through the gas filter in the first and second embodiments, the third embodiment was configured such that the entire dry air passed through the gas filter.

The evaluation of the humidification performance using the same method as in the first embodiment described above showed that the dew point of the humidified air discharged from the membrane humidifier was 55° C.

Fourth Embodiment

A membrane humidifier including three cartridges was manufactured by mounting a filter member cut to a size of 280 mm×220 mm over the inner circumference surface of each cartridge and potting the same together with a bundle of hollow fiber membranes. Subsequently, the effect of the gas filter was determined using the same method as in the first embodiment described above.

TABLE 4

|  | Concentration in Inflow gas (ppm) | Concentration in Outflow gas (ppm) |
|---|---|---|
| $NH_3$ | 10 | 0.6 |
| $NO_3$ | 10 | 0.7 |
| $SO_2$ | 10 | 0.6 |

As shown in Table 4, the gas capture performance of the gas filter according to the fourth embodiment was 94%, 93%, and 94% for the harmful gases. It can be seen that gas capture performance was best for $NH_3$ and $SO_2$. The gas capture performance of the fourth embodiment was better than those of the first and second embodiments. The reason for this is that, while only a portion of the introduced dry air passed through the gas filter in the first and second embodiments, the fourth embodiment was configured such that the entire dry air passed through the gas filter.

The evaluation of the humidification performance using the same method as in the first embodiment described above showed that the dew point of the humidified air discharged from the membrane humidifier was 56° C.

Fifth Embodiment

A membrane humidifier including three cartridges was manufactured by mounting a filter member cut to a size of 170 mm×170 mm between a cap case and a middle case. Subsequently, three kinds of dry air including 10 ppm of $NH_3$, 10 ppm of $NO_3$, and 10 ppm of $SO_2$, respectively, were introduced into the membrane humidifier through a first fluid inlet 121, the gas discharged through a first fluid outlet 122 was captured, and the concentrations of the harmful gases therein were measured in order to determine the effect of the gas filter.

TABLE 5

|  | Concentration in Inflow gas (ppm) | Concentration in Outflow gas (ppm) |
|---|---|---|
| $NH_3$ | 10 | 0.5 |
| $NO_3$ | 10 | 0.4 |
| $SO_2$ | 10 | 0.4 |

As shown in Table 5, the gas capture performance of the gas filter according to the fifth embodiment was 95%, 96%, and 96% for the harmful gases. It can be seen that gas capture performance was best for $NO_3$ and $SO_2$. The gas capture performance of the fifth embodiment was better than those of the first and second embodiments. The reason for this is that, while only a portion of the introduced dry air passed through the gas filter in the first and second embodiments, the fifth embodiment was configured such that the entire dry air passed through the gas filter.

The evaluation of the humidification performance using the same method as in the first embodiment described above showed that the dew point of the humidified air discharged from the membrane humidifier was 57° C.

In the first to fifth embodiments, the dew points of the humidified air discharged from the membrane humidifier were 54 to 57° C., which shows that the embodiments have similar levels of humidification performance.

In the membrane humidifier for a fuel cell according to the present disclosure, a gas filter capable of capturing and filtering a large portion of harmful gas included in the dry air while maintaining the humidification performance can be integrated in the membrane humidifier.

The invention claimed is:

1. A membrane humidifier for a fuel cell, the membrane humidifier comprising:
   a housing unit comprising a first fluid inlet for introduction of a first fluid, a first fluid outlet for discharge of the first fluid, a second fluid inlet for introduction of a second fluid, and a second fluid outlet for discharge of the second fluid, a humidity of the first fluid introduced through the first fluid inlet being different from a humidity of the second fluid introduced through the second fluid inlet;
   at least one first cartridge installed in the housing unit, the at least one first cartridge having a plurality of hollow fiber membranes therein; and
   at least one second cartridge installed in the housing unit, the at least one second cartridge being filled only with a gas filter configured to capture harmful gas included in at least one of the first and second fluids, the gas filter having a different shape from the hollow fiber membranes, the harmful gas comprising nitrogen oxide ($NO_x$), sulfur oxide ($SO_x$), ammonia ($NH_3$), or a mixture of two or more thereof.

2. The membrane humidifier according to claim 1, wherein the gas filter comprises a non-woven fabric and a gas capture material coated on the non-woven fabric.

3. The membrane humidifier according to claim 1, wherein the gas filter comprises a yarn and a gas capture material coated on the yarn.

4. A membrane humidifier for a fuel cell, the membrane humidifier comprising:
   a housing unit comprising a first fluid inlet for introduction of a first fluid, a first fluid outlet for discharge of the first fluid, a second fluid inlet for introduction of a second fluid, and a second fluid outlet for discharge of the second fluid, a humidity of the first fluid introduced through the first fluid inlet being different from a humidity of the second fluid introduced through the second fluid inlet;
   at least one first cartridge installed in the housing unit, the at least one first cartridge having a plurality of hollow fiber membranes therein; and
   a gas filter mounted over an inner circumferential surface or an outer circumferential surface of the at least one first cartridge in such a way as to surround the plurality of hollow fiber membranes, the gas filter being configured to capture harmful gas included in at least one of the first and second fluids, the gas filter having a different shape from the hollow fiber membranes, the harmful gas comprising nitrogen oxide ($NO_x$), sulfur oxide ($SO_x$), ammonia ($NH_3$), or a mixture of two or more thereof.

5. A membrane humidifier for a fuel cell, the membrane humidifier comprising:
   a housing unit comprising a first fluid inlet for introduction of a first fluid, a first fluid outlet for discharge of the first fluid, a second fluid inlet for introduction of a second fluid, and a second fluid outlet for discharge of the second fluid, a humidity of the first fluid introduced through the first fluid inlet being different from a humidity of the second fluid introduced through the second fluid inlet;
   a plurality of first cartridges installed in the housing unit, each of the plurality of first cartridges having a plurality of hollow fiber membranes therein; and
   a gas filter mounted in the housing unit in such a way as to surround the plurality of first cartridges together, the gas filter being configured to capture harmful gas included in at least one of the first and second fluids, the gas filter having a different shape from the hollow fiber membranes, the harmful gas comprising nitrogen oxide ($NO_x$), sulfur oxide ($SO_x$), ammonia ($NH_3$), or a mixture of two or more thereof,
   wherein the gas filter comprises a non-woven fabric and a gas capture material coated on the non-woven fabric.

6. The membrane humidifier according to claim 5, wherein the gas capture material is any one selected from the group consisting of biochar, charcoal, active carbon, an acidic polymer, zeolite, platinum, a mixture of copper sulfate and titanium sulfate, niobium (Nb), sodium bicarbonate, and a mixture of two or more thereof.

7. The membrane humidifier according to claim 6, wherein the acidic polymer is any one selected from the group consisting of poly (perfluorosulfonic acid) (PFSA), sulfonated polyethersulfone (S-PES), sulfonated polyarylethersulfone (S-PAES), sulfonated polystyrene (S-PS), sulfonated polyetherketone (S-PEK), sulfonated polyetheretherketone (S-PEEK), and a mixture of two or more thereof.

8. A membrane humidifier for a fuel cell, the membrane humidifier comprising:
   a housing unit comprising a first fluid inlet for introduction of a first fluid, a first fluid outlet for discharge of the first fluid, a second fluid inlet for introduction of a second fluid, and a second fluid outlet for discharge of the second fluid, a humidity of the first fluid introduced through the first fluid inlet being different from a humidity of the second fluid introduced through the second fluid inlet;
   at least one first cartridge installed in the housing unit, the at least one first cartridge having a plurality of hollow fiber membranes therein; and
   a gas filter mounted in the housing unit in such a way that the first fluid introduced through the first fluid inlet passes through the gas filter before being introduced into lumens of the hollow fiber membranes, the gas filter being configured to capture harmful gas included in the first fluid, the gas filter having a different shape from the hollow fiber membranes, the harmful gas comprising nitrogen oxide ($NO_x$), sulfur oxide ($SO_x$), ammonia ($NH_3$), or a mixture of two or more thereof,
   wherein the housing unit comprises a middle case having the at least one first cartridge mounted therein and a pair of cap cases coupled to opposite sides of the middle case, the second fluid inlet and the second fluid outlet being formed in the middle case, the first fluid inlet and the first fluid outlet being formed in the cap cases, respectively,
   wherein the gas filter is separably mounted between the cap case having the first fluid inlet and the middle case, and
   wherein the gas filter comprises:
   a filter portion;
   a frame portion coupled to the filter portion in such a way as to surround the filter portion, and
   a sealing member provided at an end of the frame portion for preventing gas leakage through a gap between the gas filter and the cap case having the first fluid inlet.

9. The membrane humidifier according to claim 8, wherein
   the filter portion comprises a non-woven fabric and a gas capture material coated on the non-woven fabric.

* * * * *